United States Patent [19]

Kuribayashi

[11] 3,732,375

[45] May 8, 1973

[54] PAIRED SIGNAL TRANSMISSION SYSTEM UTILIZING QUADRATURE MODULATION

[75] Inventor: Michio Kuribayashi, Tokyo, Japan

[73] Assignee: Nippon Electric Company, Limited, Tokyo, Japan

[22] Filed: Jan. 22, 1970

[21] Appl. No.: 4,872

[30] Foreign Application Priority Data

Jan. 24, 1969 Japan ....................................44/4706

[52] U.S. Cl. ..................179/15 BT, 343/200, 325/36, 325/49

[51] Int. Cl. ..................................................H04h 5/00

[58] Field of Search .......................343/200, 205, 207; 325/26, 36, 49, 50, 60, 138, 329; 179/15 BT, 15 BC

[56] References Cited

UNITED STATES PATENTS

| | | | |
|---|---|---|---|
| 3,388,214 | 6/1968 | Eilers | 325/36 X |
| 3,566,036 | 2/1971 | Roche | 325/49 X |
| 3,378,771 | 4/1968 | Van Gerwin | 325/60 X |
| 3,511,936 | 5/1970 | Saltzberg | 179/15 |
| 3,518,680 | 6/1970 | McAuliffe | 325/60 X |
| 2,698,379 | 12/1954 | Boelens | 325/36 X |
| 3,522,537 | 8/1970 | Boughtwood | 325/49 |
| 2,874,221 | 2/1959 | Dauguet | 325/36 X |

*Primary Examiner*—Robert L. Griffin
*Assistant Examiner*—William T. Ellis
*Attorney*—Marn & Jangarathis

[57] ABSTRACT

Signal transmission systems for the transmission of a pair of information signals are provided in accordance with the teachings of the present invention wherein a pair of carrier signals in quadrature phase relation are amplitude modulated, respectively, by the pair of information signals. One of the carrier signals, a double sideband signal obtained from amplitude modulating such one carrier signal with one of the pair of information signals and a double sideband signal obtained by amplitude modulating the other of the carrier signals with the other of the information signals which has had the low frequency components removed therefrom are transmitted as quadrature modulation signals to at least one receiving station over a predetermined transmission path. At the receiving station, one of the carrier signals is regenerated from the quadrature modulation signals received thereby and such regenerated carrier signal is relied upon to accomplish the demodulation of the quadrature modulation signals received.

1 Claim, 5 Drawing Figures

INVENTOR.
Michio Kuribayashi
BY
Marn & Jangarathis
ATTORNEYS

PAIRED SIGNAL TRANSMISSION SYSTEM UTILIZING QUADRATURE MODULATION

This invention relates to signal transmission systems and more particularly to program signal transmission systems employing quadrature modulation for transmitting program signals such as stereophonic sound signals through a predetermined transmission path.

In the transmission of monophonic program signals between transmitting stations and remotely located receiving stations linked by a transmission path such as a multichannel telephone line it is conventional to amplitude modulate a carrier with the monophonic program signals to be transmitted and thereafter to transmit only a single sideband derived therefrom to the remotely located receiving stations so that no overload occurs at any of the repeating amplifiers which are periodically located in the transmission path residing between such transmitting and receiving stations. Transmission systems employing this conventional mode of operation are known as independent synchronization systems and are considered highly advantageous when the transmission paths residing between the transmitting and receiving stations take the form of a transmission line such as a multichannel telephone line which may include microwave links, coaxial cables, mixed microwave links and coaxial cables, cable pairs or a space transmission route via communications satellites. In such independent synchronization program signal transmission systems, as only a single sideband of the modulated carrier is transmitted through a transmission path which includes a plurality of periodically spaced repeating amplifiers, it will be manifest that the demodulated program signals obtained at a receiving station therein will invariably exhibit marked frequency shifts when compared with the original program signals to be transmitted as initially applied to the transmitting station present in such signal transmission system. However, as the program signal being transmitted is monophonic in character, these marked frequency shifts in the program signal being received are not detectable by one listening to the received, demodulated program signal. When stereophonic signals are considered, however, it will be appreciated by those of ordinary skill in the art, that the frequency shifts introduced in stereophonic program signals derived from a receiver in an independent synchronization program signal transmission system will be readily detectable by a listener because the phase relationship between each signal therein is critical. Thus, program signal transmission systems employing independent synchronization techniques have not proven suitable for the transmission of stereophonic program signals. Furthermore, when the stereophonic program signals are transmitted through individual channels of a transmission path utilized in an independent synchronization program signal transmission system, it will be apparent that frequency shifts will occur independently in each channel and hence the phase relationship between each of the stereophonic program signals will not be maintained in a manner which is sufficient to enable a substantial regeneration of the stereophonic information sought to be transmitted.

In an effort to alleviate the problems associated with the transmission of stereophonic program signals in program signal transmission systems of the foregoing kind, it is conventional to transmit a carrier signal as a pilot signal in addition to the transmission of sideband signals containing the information sought to be transmitted. This approach to alleviating the problems associated with the transmission of stereophonic program signals is based upon the theory that the phase of the pilot signal may be detected at a receiving station and relied upon to synchronize the demodulation of the information containing sideband signals so that frequency shifts therein may be avoided. However, this conventional solution does not achieve a high degree of practical utility because in actual transmission systems of this type, the frequency spectrum of the transmitted sideband signals include low frequency components which are closely associated with the frequency of the carrier and hence render the separation of the carrier from the received composite signal a difficult task which cannot generally be performed solely by filtering techniques. Thus, as it is not generally possible to accomplish the separation of the carrier, pilot signal from the composite signal received by conventional filter means, highly complex and expensive electronic separation techniques must be employed which thereby render the resulting transmission system and more particularly the receiving stations therein highly expensive to manufacture. Furthermore, even if filter means were available which could achieve appropriate separation of a carrier signal from the low frequency components of the information containing sideband signals transmitted therewith, it would be highly difficult to realize automatic phase control apparatus capable of compensating for the phase characteristics of such filters.

The obvious solution to the problem posed in the separation of a carrier signal, which acts as a pilot signal, from information containing sideband signals transmitted therewith is to assure that such sidebands do not contain frequency components which are closely associated with the frequency of the carrier signal. This could be accomplished by prefiltering the information signals to be transmitted prior to the transmission thereof so that low frequency components therein are removed whereupon the sideband signals developed from carrier signals modulated by such information signals would not contain any spectral components which are closely associated with the carrier frequency and hence the carrier signal could be separated at a receiving station by the mere application of conventional filtering techniques to the composite signals received thereat. This solution would enable a carrier signal transmitted as a pilot signal to be easily separated at a receiving station by the mere application of filtering techniques thereto and would avoid the introduction of spurious phase shifts therein; however, as the recovered information would not contain low frequency components which are necessary in cases where the stereophonic information signals represent music or similar information, this solution is not desirable in ordinary broadcast situations and hence not usable in generalized program signal transmission systems.

The instant invention proceeds upon the recognition that several well known transmission principles may be combined to achieve program signal transmission systems for the transmission of program signals such as stereophonic sound signals through a predetermined transmission path such as a transmission line in a manner such that said program signals may each be recovered in a precise phase relationship with each other and a carrier signal transmitted as a pilot signal while the separation of said carrier signal is easily accomplished. For example, it is known that although the signal level fluctuations in a double sideband amplitude modulation signal affect the amplitude of the carrier transmitted therewith, the phase of such carrier is not affected thereby. Furthermore, it is a well known characteristic of quadrature modulation, wherein a pair of carriers are used in a quadrature phase relation (90° phase difference) and are amplitude modulated by a pair of program signals respectively, that when one of the carriers or a first carrier is transmitted as a pilot signal for phase synchronization, the signal level fluctuations in both of the sideband signals derived therefrom will have no adverse effect on the phase of the carrier signal associated therewith while the signal level fluctuations in both sideband signals associated with the other or second carrier, not transmitted and in quadrature with the first carrier, will have a substantial effect on the phase of said one or first carrier transmitted as a pilot signal. Therefore, as the low frequency components contained in stereophonic program signals are critical for realistic reproduction but are nondirectional in character, it has been found that if the low frequency components of the program signals utilized to amplitude modulate the quadrature carrier in a program signal transmission system employing quadrature modulation are removed and the sideband signals associated with such quadrature carrier are allocated considerably far from the frequency of the carrier signal transmitted as a pilot signal, the sideband signals associated with the transmitted carrier signal may be allowed to contain low frequency components which are relatively close to the frequency of the carrier signal and no adverse effects in the phase of the transmitted carrier signal will result therefrom because no phase fluctuating components of the sideband signals associated with the quadrature carrier exist in the vicinity of the frequency of the transmitted first carrier signal. Thus, in this manner a carrier signal may be transmitted as a pilot signal and used to synchronously demodulate information containing sideband signals transmitted therewith while phase shifts in the carrier signal are avoided so that the stereophonic information conveyed by such sideband signals may be easily and accurately recovered together with the low frequency components associated therewith.

Therefore it is an object of this invention to provide signal transmission systems employing quadrature modulation for transmitting program signals such as stereophonic sound signals through predetermined transmission paths.

It is an additional object of the present invention to provide signal transmission systems wherein a carrier signal is transmitted for use as a pilot signal with a plurality of information containing sideband signals and such carrier signal may be readily regenerated at a remotely located receiving station due to the absence of signal components in said information containing sideband signals which are capable of adversely affecting the phase of said carrier signal.

It is another object of the present invention to provide transmission systems wherein a carrier signal is transmitted as a pilot signal in conjunction with information containing sideband signals and the regeneration of said pilot signal at remotely located receiving stations may be easily accomplished due to the allocation of the phase affecting components of said carrier signals as present in such sideband signals at frequencies which do not reside in the vicinity of the frequency of said carrier signal while the amplitude affecting components of said carrier signal as present in said sideband signals reside in the vicinity of the frequency of said carrier signal.

It is a further object of the present invention to provide signal transmission systems employing quadrature modulation for the transmission of a plurality of program signals wherein a first carrier signal is transmitted together with sideband signals associated therewith and sideband signals associated with a second carrier signal in quadrature with said first carrier signal, said sideband signals associated with said second carrier signal having the low frequency components removed therefrom so that the allocation of the phase affecting components of the transmitted carrier signal are remote from the vicinity of the frequency of the transmitted carrier.

Other objects of the present invention will become apparent from the detailed description of several exemplary embodiments thereof which follow herein and the novel features of the present invention will be particularly pointed out in conjunction with the claims appended hereto.

In accordance with the teachings of the present invention program signal transmission systems employing quadrature modulation are provided wherein a pair of carrier signals in quadrature phase relation are amplitude modulated by a pair of program signals, respectively; one of said carrier signals, a double sideband signal obtained from amplitude modulating said one carrier signal with one of said program signals and a double sideband signal obtained from amplitude modulating another of said carrier signals with the other of said program signals which has had the low frequency components removed therefrom are transmitted to at least one receiving station over a predetermined transmission path; at said at least one receiving station, said one carrier signal is regenerated by extracting said one carrier signal together with the low frequency components of the double sideband signal derived from the amplitude modulation of said one carrier signal from the signals received thereat; and said regenerated carrier signal is relied upon in demodulating the signals received at said at least one receiver station.

The invention will be more clearly understood by reference to the following detailed description of several exemplary embodiments thereof in conjunction with the accompanying drawings, in which.

Figure 1:
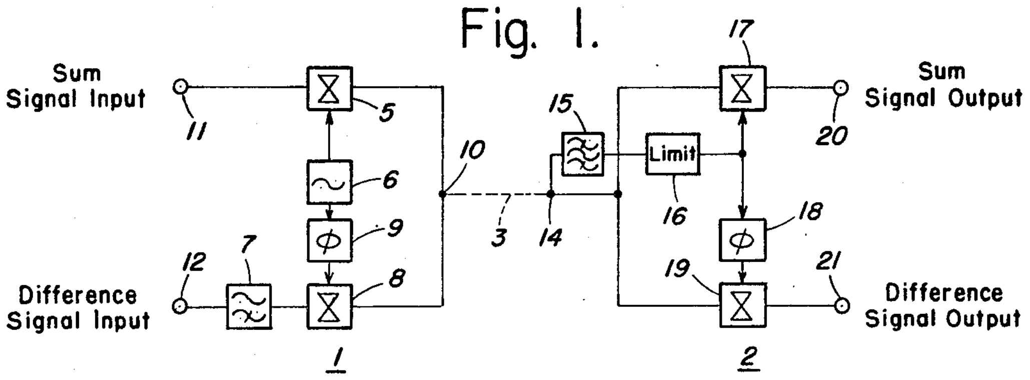
FIG. 1 is a block diagram which schematically illustrates one embodiment of a signal transmission system according to the teachings of the present invention.

Referring now to the drawings and more particularly to FIG. 1 thereof, there is shown a block diagram which serves to schematically illustrate one embodiment of a signal transmission system according to the teachings of the present invention. The embodiment of the present invention shown in FIG. 1 comprises a transmitting station 1 and a receiving station 2 interconnected by an appropriate transmission path 3. In FIG. 1 only one transmitting and receiving station has been illustrated so that the disclosure of the instant invention may proceed in a simplified manner uncluttered by the repetition which would be introduced by the illustration and description of a larger signal transmission system; however, as will be obvious to those of ordinary skill in the art, actual signal transmission systems according to the present invention may include a plurality of transmitting and receiving stations linked by a plurality of transmission paths without deviating a whit from the concepts disclosed herein. The transmitting station 1, as shown in FIG. 1, includes first modulator means 5, carrier generator means 6, high-pass filter means 7, second modulator means 8 and phase shifter means 9. The first modulator means 5 may take the form of any conventional modulating device which acts in the well known manner to amplitude modulate a carrier signal applied to a first input thereof with signal information which is applied to a second input thereto and provide an output signal which includes both sidebands derived from the modulating operation performed as well as the carrier frequency. The output of the first modulator means 5 is connected to the transmission point 10 associated with the transmission path 3 as shown in FIG. 1 while the first input to the first modulator means 5 is connected to the carrier generator means 6 and the second input to the first modulator means 5 is connected to input terminal means 11 which, as shall be seen below, is adapted to receive a program information signal in the form of a sum input signal. The carrier generator means 6 may take the form of any conventional signal generating device which produces an alternating waveform having a requisite frequency such that the waveform produced thereby may be used as a main carrier. The carrier generator means 6 is connected at one output thereof to the first input of the first modulator means 5 so as to provide main carrier signals thereto and at another output thereof to the phase shifter means 9. The phase shifter means 9 may take the conventional form of a quadrature phase shifting device which acts in the well known manner to insert a 90° phase shift in the main carrier signals applied thereto. The output of the phase shifter means 9 is connected to the carrier or first input of the second modulator means 8. The second modulator means 8 may take the well known form of a suppressed carrier modulating device which acts in the well known manner to amplitude modulate carrier signals applied to a first input thereof with signal information applied to a second input thereof and produce a double sideband output signal in the well known manner. The output of the second modulator means 8 is connected, as shown in FIG. 1, to the transmission point 10 associated with the transmission path 3 while the second or information receiving input to the second modulator means 8 is connected to the output of the high-pass filter means 7. The high-pass filter means 7 may take the form of any conventional filter means which acts in the well known manner to substantially attenuate input signals received thereby which reside in the vicinity of a predetermined cutoff frequency while acting to pass any of such input signals having a frequency substantially above such predetermined cutoff frequency. In the case of the high-pass filter means 7 illustrated in FIG. 1, the cutoff frequency is selected at a value which is suitable so that the signals passed thereby after appropriate modulation will not produce sideband signals having frequency components in the vicinity of the frequency of the main carrier signal produced by the carrier generator means 6. The input to the high-pass filter means 7 is connected to input terminal means 12 which as shall be seen below is adapted to receive a program information signal in the form of a difference input signal.

As the outputs of the first and second modulator means 5 and 8 are each connected to the transmission point 10, it will be appreciated by those of ordinary skill in the art that the combined output signals applied to the transmission point 10 will be applied to the transmission path 3 and will propagate there-through toward the receiving station 2. The transmission path 3 may take the form of a transmission line such as a multichannel telephone line in the form of either microwave links, coaxial cables, mixed microwave links and coaxial cables, cable pairs or a space transmission route via one or more communications satellites; and accordingly, the transmission point 10 will take an appropriate form, depending upon the nature of the transmission path 3 for the application of the outputs of the first and second modulator means 5 and 8 thereto. The transmission path 3, as shown in FIG. 1, is further associated with a reception point 14 as present at the receiving station 2.

The receiving station 2 comprises filter means 15, limiter means 16, first amplitude demodulator means 17, phase shifter means 18 and second amplitude demodulator means 19. The filter means 15 is connected to the reception point 14 and may take the form of a conventional carrier extraction filter which has a passband centered at the frequency of the main carrier signal and acts in the well known manner upon signals applied thereto to pass only the components of such signals which reside at the frequency of the carrier signal or within the narrow passband of said filter means 15. The phase characteristic of the filter means 15 is designed to be point symmetric with respect to the frequency of the carrier signal and the attenuation characteristic thereof is also selected to be symmetric with respect to the frequency of said carrier signal. As the input of the filter means 15 is connected to the reception point 14 it will be appreciated that said filter means 15 will act in the conventional manner of a carrier extraction filter to produce at the output thereof the amplitude modulated main carrier signal with a modulating ratio of less than 100 percent. The output of filter means 15 is connected to the limiter means 16.

The limiter means 16 may take the form of a conventional zero cross wave converter which acts in the usual manner to amplitude limit the input signals applied thereto so that in the case of the receiving station 2, illustrated in FIG. 1, only the main carrier signal is present at the output thereof. The output of the limiter means 16, as shown in FIG. 1, is applied to both the first input of the first amplitude demodulator means 17 and the input of the phase shifter means 18. The first demodulator means 17 may take the form of conventional demodulator means which acts in the well known manner to synchronously demodulate input signals applied to a second input thereto in a manner determined by carrier signals applied to a first input thereof. The second input to the first demodulator means 17 is connected to the reception point 14 while the output thereof is connected to the output terminal means 20.

The phase shifter means 18 may take the same form as the phase shifter means 9 present in the transmitting station 1 and accordingly acts to impart a quadrature phase shift of 90° to carrier signals applied to the input thereof by the limiter means 16. The output of the phase shifter means 18 is connected to the first or synchronizing input of the second amplitude demodulator means 19. The second demodulator means 19 may take precisely the same form as the first demodulator means 17 and thus acts in the well known manner to synchronously demodulate input signals applied to a second input thereof in a manner determined by the quadrature carrier signals applied to the first input thereof. The second input to the second demodulator means 19 is connected to the reception point 14 while the output thereof is connected to the output terminal means 21. As shall be seen below, in conjunction with the description of the operation of the embodiment of this invention shown in FIG. 1, sum information signals applied to input terminal means 11 of the transmitting station 1 will be recovered at output terminal means 20 of the receiving station 2 while difference information signals applied to input terminal means 12 of the transmitting station 2 will be recovered with their low frequency components removed at output terminal means 21 of the receiving station 2.

In the operation of the exemplary signal transmission system of the present invention, as illustrated in FIG. 1, program signals in the form of sum information signals, which may be considered to represent the sum (L + R) signals of both channels of a stereophonic sound program, are applied as input signals to the input terminal means 11 of the transmitting station 1 while program signals in the form of difference information signals representing the difference (L − R) signals between each of the channels of a stereophonic sound program are applied to the input terminal means 12 of said transmitting station 1. The sum signals applied to the input terminal means 11 are applied to the second input of the first modulator means 5 which acts in the conventional manner to modulate the carrier signals applied to the first input thereof by the carrier generator means 6 with said sum input signals. The first modulator means 5 thereby produces, in the well known manner, at the output thereof a double sideband signal and a carrier signal which are applied to the transmission point 10. The nature of the output produced by the first modulator means 5 and applied to the transmission point 10 may further be appreciated by briefly referring to FIG. 2 which is a graphical representation of the frequency spectrum of the information signals transmitted in the embodiment of the invention depicted in FIG. 1. Accordingly, in FIG. 2, the frequency of the carrier signal is indicated by the vertical arrow referenced $f_0$ while the frequency spectrum of each of the sum information sideband signals produced by the first modulator means 5 is represented by the solid blocks annotated sum signal which are symmetrically disposed on either side of the arrow referenced $f_0$ and include significant low frequency components in the vicinity of the frequency of the carrier signal.

Figure 2:
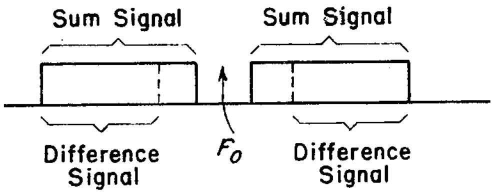
FIG. 2 is a graphical representation of the frequency spectrum of the information signals transmitted in the embodiment of the invention shown in FIG. 1.

The difference information signals applied to the input terminal means 12 are applied to the second input of the second modulator means 8 through the high-pass filter means 7. As the high-pass filter means 7 has a cutoff frequency which is selected to substantially attenuate, as aforesaid, the low frequency components present in the input signals applied thereto; the different signals applied to the second input of the second modulator means 8 will have any low frequency components initially present therein suppressed. The second modulator means 8 also receives at the first input thereto, as stated above, a quadrature carrier signal produced by the insertion of a 90° quadrature phase shift in the main carrier signal generated by the carrier generator means 6, by the application of an output of said carrier generator means 6 to the first input of said second modulator means 8 through the phase shifter means 9. As the second modulator means 8 takes the form, as aforesaid, of a suppressed carrier modulating device, the second modulator means 8 produces a quadrature output signal which includes only a double sideband signal containing the filtered difference information signal applied to the input terminal means 12. Furthermore, as the difference signals applied to the input terminal means 12 are applied to the first input of the second modulating means 8 through the high-pass filter means 7 to thereby remove the low frequency components therefrom, as aforesaid, the double sideband signal produced by the second modulator means 8 and thereafter applied to the transmission point 10 will not contain any spectral frequency components in the vicinity of the frequency of the carrier signal. The nature of the output produced by the second modulator means 8 and applied to the transmission point 10 may be further appreciated by a consideration of the graphical representation depicted in FIG. 2 of the frequency spectrum of the information signals transmitted in the embodiment of this invention shown in FIG. 1. The frequency spectrum of each of the difference signal sidebands produced by the second modulator means 8 are represented in FIG. 2 by the portions of the solid blocks annotated difference signal and bounded by two solid lines in each of said solid blocks and the dashed lines drawn therein. Thus, it will be appreciated that the removal of the low frequency components from the difference signals applied to the input terminal means 12 effectively accomplishes the removal of the phase fluctuating components from the frequency spectrum of the quadrature double sideband signals produced by the second modulator means 8 because such double sideband signals do not include spectral frequency components which reside in the vicinity of the frequency $f_0$ of the main carrier signal.

The carrier signal and the sum double sideband information signals applied to the transmission point 10 by first modulator means 5 and the difference double sideband information signals applied to the transmission point 10 by the second modulator means 8 are applied to and propagate through the transmission path 3 in the well known manner; and accordingly, are received at the reception point 14 present in the receiving station 2 as well as at any other receiving station which may be selectively connected to the transmission path 3. In the receiving station 2, as aforesaid, the input to the filter means 15 and the second input to the first and second demodulator means 17 and 19 are each connected to the reception point 14 and thus receive therefrom the carrier signal, the double sideband sum information signals and the double sideband difference information signals transmitted thereto from the transmitting station 1. The filter means 15 as previously stated takes the form of a conventional carrier extraction filter which has a passband centered at the frequency of the main carrier signal, a phase characteristic which is point symmetric with respect to the frequency of said carrier signal and an attenuation characteristic which is symmetric with respect to said carrier signal. Therefore, the filter means 15 will pass only the frequency components of the input signals applied thereto which reside at the frequency of the carrier signal or in the narrowly defined passband thereof which is centered at the frequency of said carrier signal. Thus, of the plurality of input signals received at the reception point 14, the filter means 15 will pass only the carrier signal and the frequency components of the double sideband information signals applied thereto in the vicinity of the frequency of the carrier signal to thereby produce at the output thereof an amplitude modulated carrier signal having a modulating ratio which is less than 100 percent. However, as was described above and is clearly shown in FIG. 2, since the difference double sideband information signals produced by the second modulator means 8 do not include spectral frequency components in the vicinity of the frequency of the carrier signal, due to the removal of the low frequency components from the difference information input signal, the output signal of the filter means 15 will include only the carrier signal and the appropriate spectral components of the double sideband sum information signals as it is only the double sideband sum information signals which include spectral frequency components in the vicinity of the frequency of the carrier signal. Accordingly, the filter means 15 acts to entirely suppress the double sideband difference information signals so that carrier fluctuation is avoided due to the absence of quadrature sideband information signal components in the output of the filter means 15.

The output of the filter means 15 which includes only the carrier signal and the spectral frequency components of the double sideband sum information signals in the vicinity of the frequency of the carrier signal, as aforesaid, is applied to the input of the limiter means 16. As the limiter means 16 acts to amplitude limit the input signals applied thereto to an appropriate amplitude which resides below the threshold level thereof, it will be appreciated that the output of the limiter means 16 will correspond to the main carrier signal initially generated at the transmitting station 1 and hence in the embodiment of this invention shown in FIG. 1, the filter means 15 and the limiter means 16 act in combination to regenerate the main carrier signal while avoiding carrier phase fluctuation which normally attends such regeneration. The output of the limiter means 16 is applied to both the first input of the first demodulator means 17 to thereby synchronize the demodulation operation carried out thereat and to the input of the phase shifter means 18. The phase shifter means 18 acts in the well known manner to introduce a quadrature phase shift (90°) into the carrier signals applied thereto and to apply the quadrature carrier signals produced thereby to the first input of the second demodulator means 19. Thus it is seen that carrier signals are regenerated without any attendant fluctuation by the filter means 15 and the limiter means 16 and applied directly to the first input of the first demodulator means 17 while quadrature carrier signals are derived from such regenerated carrier signals and applied to the first input of the second demodulator means 19.

As the first demodulator means 17 is connected to the reception point 14 at the second input thereof, it will be appreciated that the carrier signal, the double sideband sum information signals and the double sideband difference information signals applied to the reception point 14 through the transmission path 3 will be further conveyed to the second input of said first demodulator means 17. Therefore, as the first demodulator means 17 also receives carrier signals from the output of the limiter means 16 at the first input thereto, the operation of the first demodulator means 17 will be synchronized in the conventional manner by the carrier signals applied to the first input thereof so that only the double sideband sum information signals associated with the main carrier signal will be demodulated thereby and produced at the output thereof. Accordingly, it will be seen that the sum information input signal originally applied to the input terminal means 11 of the transmitting station 1 will be produced at the output of the first demodulator means 17 and applied thereby to the output terminal means 20. In similar manner, the second demodulator means 19 is connected to the reception point 14 at the second input thereof and receives a quadrature carrier signal at the first input thereof as applied thereto by the phase shifter means 18. Therefore, the second demodulator means 19 will act in the well known manner to synchronously demodulate only the quadrature double sideband difference information signal applied thereto to thereby produce at the output thereof the difference information input signal applied to the input terminal means 12, as present in the transmitting station 1, with the low frequency components removed therefrom due to the action of the filter means 7. The output of the second demodulator means 19 is applied to the output terminal means 21 whereby band limited difference signals are available therefrom.

From the foregoing explanation of the operation of the embodiment of the signal transmission system according to the present invention, as shown in FIG. 1, it will be seen that the sum information input signals applied to the input terminal means 11 of the transmitting station 1 are recovered at the output terminal means 20 of the receiver station 2 in substantially their original form while the difference information input signals applied to the input terminal means 12 of the transmitting station 1 are recovered at the output terminal means 21 of the receiver station 2 with the low frequency components removed therefrom. The sum and difference input information signals thereby recovered at the receiving station 2 may then be used to obtain the left and right stereophonic signals to be reproduced at said receiving station 2 in the traditional manner. It should be noted that because of the elimination of the low frequency components from the transmitted, received and demodulated difference information input signal, both the left and right stereophonic signals obtained from the receiving station 2 will include the same low frequency components as transmitted to said receiving station 2 and recovered from the double sideband sum information signals. However, this presents no serious auditory impediment because the perceivable directivity of the low frequency components present in a given stereophonic channel are quite low. Thus it will be appreciated that the embodiment of the signal transmission system according to the present invention, as shown in FIG. 1, enables the transmission of program signals such as stereophonic sound signals through a predetermined transmission path and the recovery thereof in a properly phased relationship at a remotely located receiving station by the transmission of a pilot signal and the appropriate frequency allocation of sideband signals containing program signal information such that said sideband signals do not include frequency components capable of substantially affecting the phase of said pilot signal but do include the requisite low frequency components necessary for the natural reproduction of said program signals at said receiving station.

Figure 3:
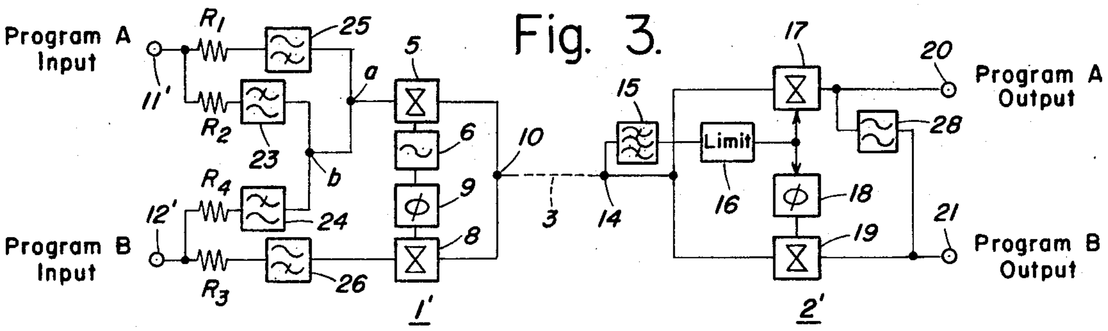
FIG. 3 is a block diagram schematically illustrating another embodiment of a signal transmission system according to the present invention.

FIG. 3 is a block diagram which schematically illustrates another embodiment of a signal transmission system according to the present invention. The embodiment of the signal transmission system illustrated in FIG. 3 possesses the advantage that sum and difference program information signals need not be used therewith as the transmitting station thereof is adapted to directly accept the program signals sought to be transmitted and thus in the case of the stereophonic program signals, the individual channel signals may be directly applied to the transmitting station thereof. As the embodiment of this invention illustrated in FIG. 3 employs a plurality of means whose structure and function are the same as those shown and explained above in conjunction with FIG. 1, where appropriate, such means as are common to FIG. 1 have retained previously adopted reference numerals and will be described hereinafter by way of reference to FIG. 1 so that undue repetition is avoided.

The embodiment of the signal transmission system according to the teachings of the present invention, as shown in FIG. 3, comprises a transmitting station 1' and a receiving station 2' interconnected by a transmission path 3. In FIG. 3 only one transmitting and receiving station has been illustrated to insure the simplicity of the description thereof; however, as will be obvious to those of ordinary skill in the art, actual signal transmission systems according to the present invention may include a plurality of transmitting and receiving stations linked by a plurality of transmission paths. The transmitting station 1', shown in FIG. 3, comprises first modulator means 5, carrier generator means 6, second modulator means 8, phase shifter means 9, first and second low-pass filter means 23 and 24 and first and second high-pass filter means 25 and 26. The first modulator means 5, the carrier generator means 6, the second modulator means 8 and the phase shifter means 9 each may take the same form, perform the same function and are interconnected in the same manner as are their corresponding components present in the transmitting station illustrated in FIG. 1. Thus it will be appreciated that a main carrier signal is generated by the carrier generator means 6, a main carrier signal is applied to a first input of the first modulator means 5 while a quadrature carrier signal is applied to a first input of the second modulator means 8 and the outputs of each of the first and second modulator means 5 and 8 are commonly connected to the transmission point 10 associated with the transmission path 3.

A second input of the first modulator means 5 is connected to junction point a which is connected to the output of the first high-pass filter means 25 and to junction point b which may be considered, for reasons to be set forth below, an output of a low frequency branching network. The first high-pass filter means 25 may comprise a conventional high-pass filter device similar to that described in conjunction with the high-pass filter means 7 shown in FIG. 1 and therefore acts in the well known manner to substantially attenuate any low frequency components which reside at or below the cutoff frequency thereof. The output of the first high-pass filter means 25 is connected to junction point *a*, as aforesaid, while the input thereof is connected to input terminal means 11' through the coupling resistor $R_1$. The input terminal means 11', as shall be seen below, is adapted to receive a program information signal such as one channel signal of a pair of stereophonic channel programs. Thus, it will be appreciated that the path formed between the input terminal means 11' and the junction point a by the coupling resistor $R_1$, and the first high-pass filter means 25 forms a high-pass portion of a frequency dividing network interposed between input terminal means 11' and the second input to the first modulator means 5.

The input terminal means 11' is also connected to the junction point a through another coupling resistor $R_2$ and the first low-pass filter means 23 to thereby form a low-pass portion of the frequency dividing network interposed between input terminal means 11' and the second input to the first modulator means 5. The first low-pass filter means 23 may be conventional in form and is selected to be complementary to the first high-pass filter means 25 so that said first low-pass filter means 23 exhibits the same cutoff frequency as said first high-pass filter means 25 and thus acts to pass therethrough only the components of input signals applied thereto which reside below the predetermined cutoff frequency thereof. The output of the first low-pass filter means 23 is connected to junction point b and hence to the second input of the first modulator means 5.

The second input of the second demodulator means 8 is connected through the second high-pass filter means 26 and a coupling resistor $R_3$ to the input terminal means 12'. The second high-pass filter means 26 may take the same form as the first high-pass filter means 25 described above to thereby establish a high-pass frequency branch of a frequency dividing network associated with input terminal means 12' between said input terminal means 12' and the second input to the second modulator means 8. The input terminal means 12', as shall be seen below, is adapted to receive another program information signal such as the second channel program of a pair of stereophonic channel programs and hence the second high-pass filter means 26 acts in the well known manner to pass the frequency components of said another channel program which resides above the cutoff frequency thereof to the second input of the second modulator means 8. The input terminal means 12' is also connected through the coupling resistor $R_4$ and the second low-pass filter means 24 to the junction point *b*. The second low-pass filter means 24 may take precisely the same form as the first low-pass filter means 23 and thus forms the low-pass portion of the frequency branching network associated with the input terminal means 24. Therefore, it will be seen that the transmitting station 1' is formed in a manner such that both the high and low frequency components of the input information signals applied to input terminal means 11' are applied to the second input of the first modulator means 5, the high frequency components of the input information signals applied to the input terminal means 12' are applied to the second input of second modulator means 8, the low frequency components of the input information signals applied to the input terminal means 12' are applied to the second input of the first modulator means 5 and the outputs of each of the first and second modulator means 5 and 8 are commonly connected to the transmission point 14 for application to the transmission path 3.

As will be appreciated by those of ordinary skill in the art, the combined output signals applied to the transmission point 10 at the transmitting station 1' will be applied to the transmission path 3 and will propagate therethrough toward the receiving station 2. The transmission path 3 may take any of the forms of transmission lines described above in conjunction with FIG. 1 and accordingly, the transmission point 10 will take the requisite form, depending upon the nature of the transmission path 3, for the application of the outputs of the first and second modulator means 5 and 8 thereto. The transmission path 3, as illustrated in FIG. 3, terminates at a reception point 14 located at the receiving station 2; however, as will be manifest to those of ordinary skill in the art, a number of independent receiving stations may be readily associated with the transmission path 3.

The receiving station 2' comprises filter means 15, limiter means 16, first demodulator means 17, phase shifter means 18, second demodulator means 19 and low-pass filter means 28. The filter means 15, the limiter means 16, the first demodulator means 17, the phase shifter means 18 and the second demodulator means 19 may each take the same form, perform the same function and are interconnected in the same manner as their corresponding components shown in the embodiment of this invention depicted in FIG. 1 and described above. Thus, as a comparison of the receiving station 2 shown in FIG. 1 with the receiving station 2' illustrated in FIG. 3 will render it manifest that each of these receiving stations are virtually the same, except for the presence of the low-pass filter means 28 in the receiving station 2', the structural description of the receiving station 2' will here be omitted with regard to all of the components thereof which are common to the receiving station 2 shown in FIG. 1 and described above. Accordingly, as the low-pass filter means 28 present in the receiving station 2' is the only component not previously described above, an adequate description of the structure of the receiving station 2' may here be obtained by an appreciation that the low-pass filter means 28 may take the same conventional form as the first and second low-pass filter means 23 and 24 present in the transmitting station 1' and is interconnected between the output of first demodulator means 17 and the output terminal means 21 such that the input thereof is connected to the output of first demodulator means 17 while the output thereof is connected to the output terminal means 21 and hence added to the output of the second demodulator means 19. As shall be seen below, the function of the low-pass filter means 28 is to insert the low frequency components of output signals produced by the first demodulator means 17 to the output signals produced by the second demodulator means 19.

In the operation of the embodiment of the signal transmission system according to the present invention as shown in FIG. 3, it may be assumed for the purposes of description that two channel programs A and B of a stereophonic signal program are applied to the transmitting station 1' for transmission to the receiving station 2'. The channel program A, as indicated in FIG. 3, is applied to the input terminal means 11' present in the transmitting station 1' while the channel program B is applied to the input terminal means 12'. The stereophonic channel programs A and B should be assumed to each include the full spectrum of frequency components normally present in individual stereophonic channel programs, and for the purposes of this description of the channel program A may be considered to be composed of low frequency signal components $A_1$ which reside below a predetermined frequency and high frequency signal components $A_2$ which reside above said predetermined frequency while channel program B is similarly considered to be composed of low and high frequency signal components $B_1$ and $B_2$ residing below and above, respectively, said predetermined frequency. The channel program A applied to the input terminal means 11' is coupled to the frequency division network formed by the high-pass branch which includes coupling resistor $R_1$ and the first high-pass filter means 25 and the low-pass branch formed by coupling resistor $R_2$ and the first low-pass filter means 23. Therefore, as the predetermined frequency which separates the low and high frequency signal components $A_1$ and $A_2$ present in channel program A may be considered to be the same frequency selected as the cutoff frequency for the first high-pass filter means 25 and the first low-pass filter means 23, it will be appreciated that the high frequency signal components $A_2$ present in channel program A will applied to the junction point a through the coupling resistor $R_1$ and the first high-pass filter means 25 while low frequency signal components $A_1$ present in channel program A will be applied to junction point b through the coupling resistor $R_2$ and the first low-pass filter means 23. In similar manner, the channel program B applied to the input terminal means 12' is divided by the frequency division network associated therewith so that the high frequency signal components $B_2$ present therein are applied to the second input of second modulator means 8 through the coupling resistor $R_3$ and the second high-pass filter means 26 while the low frequency signal components $B_1$ present therein are applied to junction point *b* through the coupling resistor $R_4$ and the second low-pass filter means 24. As junction point *b* is connected to junction point *a*, as aforesaid, and junction point *a* is connected directly to the second input of the first modulator means 5, it is seen that the second input to the first modulator means 5 receives both the high and low frequency signal components $A_2$ and $A_1$ of the channel program A in addition to the low frequency signal components $B_1$ of the channel program B while the second input to the second demodulator means 8 has only the high frequency signal components $B_2$ of the channel program B applied thereto.

The first modulator means 5 acts in the conventional manner, previously described, to modulate the main carrier signals applied to the first input thereof by the carrier generator means 6 with the input signals applied from junction point a to the second input thereof. The first modulator means 5 will thereby produce, in the well known manner at the output thereof, a double sideband information signal and a carrier signal which are applied to the transmission point 10. In a similar manner, the second modulator means 8 acts in the suppressed carrier mode to modulate a quadrature carrier signal, produced at the phase shifter means 9 by the insertion of a 90° quadrature phase shift in the main carrier signal generated by the carrier generator means 6 and applied to the first input thereof, with the high frequency signal components $B_2$ of the channel program B applied to the second input thereof. The second modulator means 8 thereby produces at the output thereof only a quadrature double sideband information signal which is applied to the transmission point 10.

Figure 4:
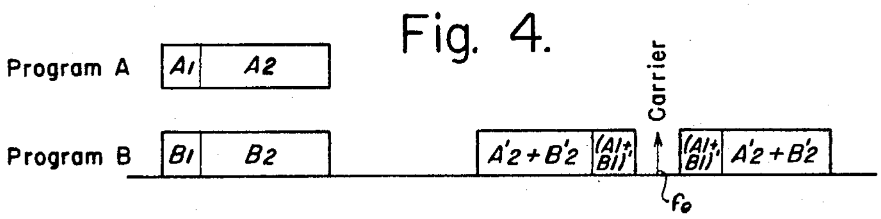
FIG. 4 is a graphical representation of a frequency spectrum allocation diagram of information signals transmitted in the embodiment of the invention shown in FIG. 3.

If the product of the main carrier signal modulated by the sum of the low frequency signal components $A_1$ and $B_1$ of the stereophonic channel programs A and B is represented by the expression $(A_1+B_1)'$, the product of the main carrier signal modulated by the high frequency signal component $A_2$ of the channel program A is represented by the expression $A_2'$ and the product of the quadrature carrier signal modulated by the high frequency signal component $B_2$ of channel program B is denoted by the expression $B_2'$; it will be evident from the foregoing description of the operation of the transmitting station 1' that $(A_1+B_1)'$, $A_2'$ and the main carrier signal will be produced at the output of the first modulator means 5 while only $B_2'$ will appear at the output of the second modulator means 8. Therefore $(A_1 + B_1)'$, $A_2'$, $B_2'$ and the main carrier signal will be applied to the transmission point 10 for application to the transmission path 3 and only $B_2'$ will be associated with the quadrature carrier and hence capable of including components which affect the phase of the transmitted main carrier signal. The nature of the signals applied to the transmission path 10 may be further appreciated by briefly referring to FIG. 4 which is a graphical representation of a frequency spectrum allocation diagram of information signals transmitted in the embodiment of the invention shown in FIG. 3. In FIG. 4, the stereophonic channel programs A and B together with the low and high frequency signal components $A_1$, $A_2$, $B_1$, and $B_2$ thereof are indicated at the extreme left of the graphical representation, while the frequency spectrum allocations of the combined outputs of the first and second modulator means 5 and 8 are indicated by a vertical arrow referenced $f_o$, representing the main carrier signal, and the solid blocks referenced $A_2' + B_2'$ and $(A_1 + B_1)'$ symmetrically disposed thereabout. As may be seen in FIG. 4, since the solid blocks including the frequency components of the quadrature double sideband signals $B_2'$ produced by the second modulator means 8 do not reside in the vicinity of the frequency $f_o$ of the carrier signal; it will be manifest that the quadrature double sideband signals $B_2'$ do not possess frequency signal components which will cause the phase of the transmitted carrier signal to vary.

The carrier signal and the double sideband information signals $(A_1+B_1)'$, $A_2'$ and $B_2'$ applied to the transmission point 10 by the first and second modulator means 5 and 8 are applied to the transmission path 3 and will propagate therethrough in the well known manner. Accordingly, the information signals applied to the transmission path 3 will be received at the reception point 14 present in the receiving station 2' as well as at any other receiving stations which may be selectively connected to the transmission path 3. In the receiving station 2', as aforesaid, the input to the filter means 15 and the second input to the first and second demodulator means 17 and 19 are each connected to the reception point 14 and thus receive therefrom the information signals, i.e., the main carrier, $(A_1 + B_1)'$ $A_2'$ and $B_2'$, received thereby from the transmission path 3. The filter means 15 acts as a conventional extraction filter and has a frequency attenuation characteristic which is capable of fully suppressing $A_2'$ and $B_2'$ and at the same time reducing the level of $(A_1 + B_1)'$ below the level of main carrier signal in a manner similar to that described above for the corresponding filter means 15 illustrated in FIG. 1. Therefore, the output signal produced by the filter means 15 will take the form of an amplitude modulated carrier signal having a modulating ratio which is less than 100 percent and includes only spectral frequency components in the vicinity of the frequency of the carrier signal which are associated with the transmitted carrier signal as distinguished from the quadrature carrier signal applied to the second modulator means 8.

The output of the filter means 15 is applied to the input of the limiter means 16 which acts in the same manner described above to amplitude limit the input signals applied thereto and produce an output signal which corresponds to the main carrier signal initially generated by the carrier generator means 6 present at the transmitting station 1'. Accordingly, it will be appreciated that in this embodiment of the present invention, the filter means 15 and the limiter means 16 act in combination to regenerate the main carrier signal while avoiding the carrier phase fluctuation which normally attends such regeneration. The output of the limiter means 16 is applied to both the first input of the first demodulator means 17 to thereby act as a synchronizing signal therefor, in the manner described above, and to the input of the phase shifter means 18. The phase shifter means 18 acts in the previously described manner to insert a quadrature phase shift (90°) into the carrier signals applied thereto and to apply the quadrature carrier signals produced thereby to the first input of the second demodulator means 19 as synchronizing signals therefor. Accordingly, it will be manifest that carrier signals are regenerated without any attendant fluctuation by the filter means 15 and the limiter means 16 and applied directly to the first input of the first demodulator means 17 while quadrature carrier signals are derived from such regenerated carrier signals and applied to the first input of the second demodulator means 19.

The second input to the first demodulator means 17 is connected to the reception point 14 and accordingly receives the information signals applied thereto through the transmission path 3. Therefore, as the first demodulator means 17 also receives a synchronizing signal at the first input thereof in the form of the regenerated main carrier signal, the operation of the first demodulator means 17 will be synchronized by the carrier signals applied to the first input thereof so that only the information signals $A_2'$ and $(A_1 + B_1)'$ associated with the main carrier signal will be demodulated thereby and the information recovered therefrom produced at the output of the first demodulator means 17. Thus it will be seen that the low frequency signal components $A_1$ and $B_1$ and the high frequency signal component $A_2$ of the channel program A and B and associated with the main carrier signal will be produced at the output of the first demodulator means 17 and applied thereby to the output terminal means 20 as well as to the input of the low-pass filter means 28. Similarly, the second demodulator means 19 is connected to the reception point 14 at the second input thereof and receives a quadrature carrier signal input at the first input thereto as applied by the phase shifter means 18. Thus, the second demodulator means 19 will act to synchronously demodulate only the quadrature double sideband information signal $B_2'$ associated with the quadrature carrier signal and hence recover therefrom the high frequency signal component $B_2$ of the channel program B originally applied to the second modulator means 8 present in the transmitting station 1' as the second input thereto. The output produced by the second demodulator means 19, which comprises the high frequency signal components $B_2$ associated with channel program B, are mixed with the information signals passed by the low-pass filter means 28 and applied to the output terminal means 21. As the input of the low-pass filter means 28 is coupled to the output of the first demodulator means 17 and the cutoff frequency of the low-pass filter means 28 is selected to be the same frequency as selected for the first and second low-pass filter means 23 and 24 present in the transmitting station 1', it will be appreciated that the low-pass filter means 28 couples the low frequency signal components $A_1$ and $B_1$ of the stereophonic channel programs A and B to the output terminal means 21. Therefore, it will be seen that the frequency signal components $A_2$, $A_1$ and $B_1$ will be present at the output terminal means 20 of the receiving station 2' while frequency signal components $B_2$, $A_1$ and $B_1$ are present at output terminal means 21 of the receiving station 2' whereby each of the stereophonic channel program signals sought to be transmitted are directly available at the output terminal means 20 and 21 of the receiving station 2'. It should again be noted that low frequency signal components $A_1$ and $B_1$ of each of the stereophonic channel program signals produced at output terminal means 20 and 21 are the same; however, this presents no serious difficulty because the perceivable directivity of the low frequency components present in a given stereophonic channel program are quite low.

The embodiment of the invention illustrated in FIG. 3 is preferable to that shown in FIG. 1 under certain circumstances because it does not require the application and processing after recovery of sum and difference program signals. Furthermore, as channel program signal components $A_1 + B_1 + A_2$ appear at output terminal means 20 and channel program signal components $A_1 + B_1 + B_2$ appear at output terminal means 21, the design of the filter means 15 used for carrier signal extraction is simplified and the complete extraction of the main carrier signal from the transmitted information signals may be realized.

Figure 5:
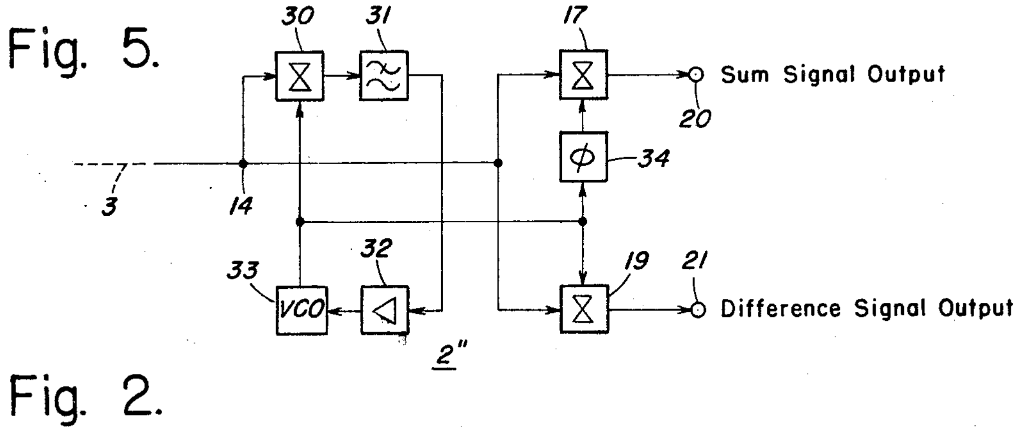
FIG. 5 is a block diagram illustrating modified receiving apparatus suitable for use in the exemplary embodiment of this invention shown in FIG. 1.

FIG. 5 is a block diagram which illustrates modified receiving apparatus suitable for use in the exemplary embodiment of this invention shown in FIG. 1. More particularly, FIG. 5 schematically illustrates a receiving station 2'' which may be substituted for the receiving station 2 shown in the signal transmission system depicted in FIG. 1 wherein a synchronizing oscillator means is relied upon in the regeneration of the main carrier signal so that a carrier extraction filter means need not be employed. The receiving station 2'' shown in FIG. 5 comprises phase detector means 30, low-pass filter means 31, d.c. amplifier means 32, synchronizing oscillator means 33, first demodulator means 17, and second demodulator means 19. The phase detector means 30 may take the conventional form of a phase comparator device which acts in the well known manner to compare the phase of input signals applied to the first and second inputs thereof and provide an output, in the form of a d.c. level, representative of the phase difference between the input signals compared. A first input to the phase detector means 30 is connected to reception point 14 which is associated with transmission path 3 in the same manner as was described in conjunction with FIG. 1. The second input to the phase detector means 30 is connected to the output of the synchronizing oscillator means 33 which, as shall be seen below, provides a signal thereto representative of the quadrature carrier signal previously described above. The output of the phase detector means 30 is connected to the input of the low-pass filter means 31. The low-pass filter means 31 may take the form of any conventional filter means which acts to pass therethrough signal components whose frequency resides below a predetermined cutoff frequency while serving to substantially attenuate and suppress signal frequency components which reside above such predetermined cutoff frequency. The output of the low-pass filter means 31 is connected to the input of the d.c. amplifier means 32. The d.c. amplifier means 32 may take any conventional form of such devices which act in the well known manner to apply a predetermined gain to d.c. signals or levels applied thereto and to provide such suitably amplified d.c. signal or level at the output thereof. The output of the d.c. amplifier means 32 is applied to the input of the synchronizing oscillator means 33. The synchronizing oscillator means 33 may take the form of a voltage controlled oscillator adapted to oscillate at a frequency which is controlled by the d.c. level applied to the control input thereof by the d.c. amplifier means 32. The output of the synchronizing oscillator means 33 is connected to the second input of the phase detector means 30 and through junction point c to the input of the phase shifter means 34 and a first input of the second demodulator means 19. Thus it will be seen that the output of the phase detector means 30, the low-pass filter means 31 and the d.c. amplifier means 32 are connected in a control loop for controlling the output of the synchronizing oscillator means 33, which output is applied to both the second input of the phase detector means 30 and to the junction point c.

The first and second demodulator means 17 and 19 may take precisely the same form and perform the same function as the correspondingly referenced components depicted in FIG. 1 and described above. The second input to the first and second demodulator means 17 and 19 are commonly connected to the reception point 14 while the outputs thereof are connected to the output terminal means 20 and 21, respectively. The first input to the first demodulator means 17 is connected to the output of the phase shifter means 34. The phase shifter means 34 may be similar to the phase shifter device previously described above but here acts, as will be seen below, upon quadrature carrier signals received from the output of the synchronizing oscillator means 30 to regenerate main carrier signals therefrom.

In operation of the embodiment of the receiving station 2'' according to this invention, as shown in FIG. 5, the phase of the main carrier signal as present in the information signals conveyed to reception point 14 and hence to the first input of the phase detector means 30 is compared with the phase of the carrier signals applied to the second input of the phase detector means 30 by the synchronizing oscillator means 33. The phase detector means 30 produces a d.c. output level corresponding to the difference in phase between the main carrier signal and the output of the synchronizing oscillator means 33 and applies such d.c. output level to the input of the low-pass filter means 31. The low-pass filter means 31 acts to remove any high frequency components from the output produced by the phase detector means 30 and further applies the output of the phase detector means 30 to the input of the d.c. amplifier means 32. The d.c. amplifier means 32 acts to apply a suitable gain to the input signals received from the output of the low-pass filter means 31 and to thereafter apply the suitably amplified input signals produced thereby to the control input of the synchronizing oscillator means 33 to control the frequency thereof. When a quadrature relationship is established between the first input to the phase detector means 30 and the second input thereto as supplied by the synchronizing oscillator means 33, the output of the low-pass filter means 31, as regards low frequency components converted from the double sideband signal components residing in the vicinity of the frequency of the main carrier signal, is set to zero and thus acts to suppress the abundant low frequency components converted by the phase detector means 30 from the components of the double sideband signals in the vicinity of the frequency of the main carrier signal applied to the first input to the phase detector means 30. This may be seen when it is recalled that in the signals transmitted to reception point 14 the only frequency components which reside in the vicinity of the frequency of the main carrier signal are the components in the double sideband sum signals which were derived by the modulation of the main carrier signal and hence are associated therewith. It follows therefore that if a quadrature relation exists between the main carrier signals applied to the first input of the phase detector means 30 and the carrier signals regenerated and applied to the second input thereof by the synchronizing oscillator means 33, the same quadrature phase relation is maintained between the vicinity components of the double sideband sum signals associated with the main carrier signals and the regenerated carrier signals provided by the synchronizing oscillator means 33. Therefore, it will be seen that the output of the phase detector means 30 will contain no low frequency components when a quadrature phase relationship obtains and hence the low-pass filter means 31 need only act to suppress high frequency double sideband difference signals applied thereto to provide a maintaining d.c. level to the control input of the synchronizing oscillator means 33 through the d.c. amplifier means 32. Thus the phase detector means 30, the low-pass filter means 31, the d.c. amplifier means 32 and the synchronizing oscillator means 33 act to maintain a quadrature relationship between the main carrier signal and the carrier signals regenerated by the synchronizing oscillator means 33 through the control loop established between the output of the phase detector means 30 and the control input to the synchronizing oscillator means 34. This operation is advantageous because it allows the cutoff frequency selected for the low-pass filter means 31 to be high and the response speed of the phase control loop to be increased whereby the response time between the main carrier signal and the regenerated carrier signals produced by the synchronizing oscillator means 33 may be decreased. Accordingly, it is seen that the synchronizing oscillator means 33 thereby acts to regenerate the same quadrature carrier signals as were provided in the other illustrated embodiments of the instant invention; however, no carrier extracting filter means need be used.

As the output of the synchronizing oscillator means 33 is connected to junction point c, regenerated quadrature carrier signals are provided to the first input of the second modulator means 19 and to the input of the phase shifter means 34. The phase shifter means 34 acts to insert a quadrature phase shift (90°) in the carrier signals applied thereto so that main carrier signals are produced thereby and provided to the first input of the first demodulator means 17. Thus, as the first input to the first demodulator means 17 has main carrier signals applied thereto, the first input to the second demodulator means 19 has regenerated quadrature carrier signals applied thereto and the second inputs of the first and second demodulator means 17 and 19 are commonly connected to the reception point 14, as aforesaid, it will be seen that the first and second demodulator means 17 and 19 act in the same manner as was described in conjunction with FIG. 1 to recover the sum and difference information signals, respectively, transmitted and to apply such recovered signals to the outputs thereof. Therefore, sum information signals applied to the input terminal means 11 of transmitting station 1 are recovered at output terminal means 20 of the receiver station 2'' in substantially their original form while the difference information signals applied to the input terminal means 12 of the transmitting station 1 are recovered at output terminal means 21 of receiver station 2'' with the low frequency components removed therefrom. The sum and difference information signals thereby recovered at the receiving station 2'' may then be relied upon to obtain left and right channel stereophonic signals having common law frequency signal components. Thus, in the receiving station 2'', illustrated in FIG. 5, precise recovery of the sum and difference information signals which are transmitted is accomplished without recourse to carrier signal extraction filter means.

Although the principles and teachings of the present invention have been disclosed herein in conjunction with several distinct embodiments thereof, it will be apparent that many modifications and adaptations of the instant invention will be obvious to those of ordinary skill in the art from the concepts set forth in the foregoing description of such embodiments. For instance, in applications of the present invention involving the transmission of an overmodulated main carrier signal, the installation of a carrier extracting filter at the receiving station, capable of attenuating the amplitude of the double sideband signals to a greater degree than the main carrier signal, would be an appropriate solution to the problems associated with the recovery of the transmitted information. Furthermore, although the exemplary embodiments of the signal transmission systems disclosed herein have been primarily associated with stereophonic program signals, it will be apparent that signal transmission systems taught by the present invention are applicable to the transmission of any pair of signals so long as the crosstalk which may exist between such two signals may be maintained within a permissible range. Such pair of signals then could be exemplified by two binary coded signals used for data transmission, two stereoscopic television signals such as will probably be used in the near future or a chrominance signal and a luminance signal which are currently used in colored television signal transmission.

Although the present invention has been disclosed in conjunction with several specific embodiments, it will be manifest to those of ordinary skill in the art that many modifications and variations of such specific embodiments may be made without departing from the inventive concepts set forth herein. Therefore it shall be clearly understood that this invention is not limited to any of the embodiments or variations set forth herein as they merely constitute preferred modes of practicing the present invention.

What is claimed is:

1. A transmission system for two information signals, comprising:

transmitting apparatus including:

a first source of an input signal having high and low frequencies;

a second source of input signal having high and low frequencies;

a first amplitude modulator;

first filter means connected between said first signal source and one input of said modulator for passing high frequencies above a first predetermined frequency and attenuating low frequencies therebelow;

second filter means connected between said first signal source and said first modulator one input for passing low frequencies below said first predetermined frequency and attenuating high frequencies thereabove;

a second amplitude modulator;

third filter means connected between said second signal source and said first modulator one input for passing low frequencies below a second predetermined frequency and attenuating high frequencies thereabove;

fourth filter means connected between said second signal source and one input of said second modulator for passing high frequencies above said second predetermined frequency and attenuating low frequencies therebelow; said second predetermined frequency being so selected that modulation utilizing said passed second signal high frequencies produces modulation components excluded from the vicinity of said carrier signal component;

a generator of a carrier frequency signal having one terminal connected to another terminal of said first modulator for producing first modulation components including double sidebands of said passed first signal high frequencies, double sidebands of the sum of said passed first and second low frequencies; and a carrier signal component;

first phase shifting means connected to second terminal of said carrier generator for providing said carrier signal with a quadrature relationship relative to the phase of said carrier signal in said first modulator; said phase shifting means connected to another terminal of said second modulator for producing second modulation components including quadrature second signal high frequency double sideband components while suppressing said quadrature carrier signal; said quadrature second signal components excluding components lying in the vicinity of said carrier signal component in said first modulation components;

circuit means supplying said first modulation components including said carrier signal component and said quadrature second signal modulation components from outputs of said first and second modulators, respectively, to a common point for transmission wherein said quadrature second modulation components unaffect the phase of said carrier signal component in said first modulation components;

and receiving apparatus for receiving said first modulation components including said carrier signal component and said quadrature second signal components transmitted from said common point, comprising:

fifth filter means for extracting from said received first modulation components a carrier signal equivalent in phase with the phase of said carrier signal generated in said transmitting apparatus;

a first amplitude demodulator activated by said received first modulation components and said extracted carrier signal for deriving therefrom an output including said first signal high and low frequencies and said second signal low frequencies;

second phase shifting means for providing said extracted carrier signal with a quadrature relationship relative to said extracted carrier signal in said first demodulator;

a second amplitude demodulator activated by said quadrature extracted carrier signal and said received quadrature second signal modulation components for deriving therefrom an output including said second signal high frequencies;

a first output terminal for receiving thereat said first signal high and low frequencies and said second signal low frequencies from said first demodulator output;

sixth filter means having a pass-band for selecting said low frequencies of said first and second input signals from said first demodulator output; and a second output terminal for receiving thereat said first and second signal low frequencies from an output of said sixth filter means and said second signal high frequencies from said second demodulator output.

* * * * *